United States Patent [19]

Ariagno et al.

[11] Patent Number: 5,256,486
[45] Date of Patent: Oct. 26, 1993

[54] HEAT-VULCANIZABLE ORGANOPOLYSILOXANE COMPOSITIONS AND PROTECTIVE SHEATHING OF ELECTRICAL CONDUCTORS THEREWITH

[75] Inventors: Daniel Ariagno, Chaponne; Pierre Barruel, Tassin La Demi-Lune; Alain Viale, Luzinay, all of France

[73] Assignee: Rhone-Poulenc Chimie, Courbevoie, France

[21] Appl. No.: 732,772

[22] Filed: Jul. 19, 1991

[30] Foreign Application Priority Data

Jul. 19, 1990 [FR] France ............... 90 09472

[51] Int. Cl.$^5$ ............... B32B 9/04; C08K 3/34
[52] U.S. Cl. ............... 428/447; 524/432; 524/449; 524/588; 524/783; 524/789; 524/860; 524/863
[58] Field of Search ............... 524/432, 449, 588, 783, 524/789, 860, 863; 428/447

[56] References Cited

U.S. PATENT DOCUMENTS

| | | | |
|---|---|---|---|
| 3,711,520 | 1/1973 | Pfeifer et al. | 260/375 B |
| 3,834,938 | 9/1974 | Bockstie et al. | 117/201 |
| 3,865,778 | 2/1975 | Christie | 524/432 |
| 3,956,166 | 5/1976 | Lewis | 524/588 |
| 3,996,188 | 12/1976 | Laur | 524/432 |
| 4,071,494 | 1/1978 | Gaylord | 524/432 |
| 4,102,852 | 7/1978 | De La Torre et al. | 524/432 |
| 4,248,768 | 2/1981 | Fraleigh et al. | 524/588 |
| 4,273,634 | 6/1981 | Saam et al. | 524/588 |
| 4,320,044 | 3/1982 | Nakamura | 524/863 |
| 4,433,096 | 2/1984 | Bokerman et al. | 524/860 |
| 4,696,970 | 9/1987 | Sumimura et al. | 524/588 |
| 4,728,687 | 3/1988 | Watanabe et al. | 524/432 |

FOREIGN PATENT DOCUMENTS 2451387 10/1980 France.

OTHER PUBLICATIONS

Derwent accession no. 79-851788 Questel Telesyste ms (WPI)Derwent Publ. Ltd. London. & JP54132799 Abstract.

Derwent accession no. 81-028940 Questel Telesyste ms (WPIL)Derwent Publ. Ltd., London. & JP 5514 4608 Abstract.

Patent Abstracts of Japan, vol. 12, No. 270(C-515) (3117) Jul. 27, 1988, & JP-A-63 51495 (SHIN etsu) Mar. 4, 1988, le document en entier.

*Primary Examiner*—John C. Bleutge
*Assistant Examiner*—Karen A. Dean
*Attorney, Agent, or Firm*—Burns, Doane, Swecker & Mathis

[57] ABSTRACT

Heat-vulcanizable silicone elastomer compositions, well adopted for conversion into mechanically strong flame-retardant protective sheathings/coatings for, e.g., electrical wires and cables, comprise (a) at least one polydiorganosiloxane polymer, (b) a reinforcing filler material and (c) a vulcanizing agent, e.g., an organic peroxide, therefor, and including a fireproofing and mechanical strength-enhancing amount of (d) mica and (e) zinc oxide.

13 Claims, No Drawings

HEAT-VULCANIZABLE ORGANOPOLYSILOXANE COMPOSITIONS AND PROTECTIVE SHEATHING OF ELECTRICAL CONDUCTORS THEREWITH

BACKGROUND OF THE INVENTION

Field of the Invention

The present invention relates to novel heat-vulcanizable silicone elastomer compositions, and, more especially, to such novel silicone elastomer compositions which can be vulcanized at temperatures typically ranging from 100° to 250° C.

This invention also relates to the protective sheathing/coating of electrical circuits with such novel compositions, to protect same against fire and flame, and especially relates to protecting electrical wires or cables (conductors) or glass fibers against fire, namely, such that said electrical wires or cables, or glass fibers, continue to function in the event of fire.

SUMMARY OF THE INVENTION

A major object of the present invention is the provision of novel heat-vulcanizable silicone elastomer compositions which have good flexibility (good elongation at break, for example greater than or equal to 180%), good resistance to flame propagation, and which, at temperatures above 500° C., are converted into an insulating and coherent ashy material which has excellent dimensional stability, excellent mechanical strength, excellent electrical insulating capacity and excellent properties of resistance to thermal shock and mechanical impact.

Briefly, the present invention features novel heat-vulcanizable silicone elastomer compositions that are particularly well adopted for the protective sheathing/coating of electrical wires and cables and which comprise:

(a) a polydiorganosiloxane polymer,
(b) a reinforcing filler,
(c) an organic peroxide,
(d) mica, and
(e) zinc oxide.

The present invention also features any substrate (for example an electrical circuit or electrical wires or cables) onto which the above compositions have been vulcanized into a crosslinked silicone elastomer, as well as the substrate coated with such elastomer after the latter has been subjected to temperatures above 500° C.

DETAILED DESCRIPTION OF THE PREFERRED EMBODIMENTS OF THE INVENTION

More particularly according to the present invention, it has now been determined that the subject compositions, by reason of the synergy between the mica and zinc oxide, provide elastomers which have good mechanical properties, especially a good elongation at break (of at least 180%) and producing, at temperatures above 500° C., an insulating and coherent substance which displays that combination of properties indicated above.

Indeed, if only mica is employed in the compositions, the ash produced from the elastomers subjected to temperatures above 500° C. can crumble under thermal shock or mechanical impact, whereas if only zinc oxide is employed, the ash produced is brittle (appearance of cracks upon being subjected to thermal shock and mechanical impact).

Thus, the silicone compositions according to the present invention comprise at least one polydiorganosiloxane polymer (a) containing from 0% to 4%, preferably from 0.01% to 3%, by weight, of vinyl recurring units. When these polydiorganosiloxane polymers (a) have viscosities at 25° C. ranging from 50,000 to 1,000,000 mPa.s, they are in the form of oils, but when their viscosities are greater than 1,000,000 mPa.s, they are then in a resinous state. In the compositions according to the present invention, the polydiorganopolysiloxane polymers may be oils or resins, or mixtures thereof. These polydiorganopolysiloxane polymers are linear polymers whose diorganopolysiloxane chain consists essentially of recurring units of the formula $R_2SiO$. Such chain is blocked at each end of the polymer by a unit of formula $R_3SiO_{0.5}$ and/or a radical of formula $OR'$
In these formulae:

i) the symbols R, which may be identical or different, are monovalent hydrocarbon radicals such as alkyl radicals, for example methyl, ethyl, propyl, octyl, octadecyl, etc.; aryl radicals, for example, phenyl, tolyl, xylyl, etc.; aralkyl radicals such as benzyl, phenylethyl, etc.; cycloalkyl and cycloalkenyl radicals such as cyclohexyl, cycloheptyl, cyclohexenyl radicals, etc.; alkenyl radicals, for example vinyl and allyl radicals, etc.; alkaryl radicals; cyanoalkyl radicals such as a cyanoethyl radical, etc.; haloalkyl, haloalkenyl and haloaryl radicals such as chloromethyl, 3,3,3-trifluoropropyl, chlorophenyl, dibromophenyl and trifluoromethylphenyl radicals; and (ii) the symbol $R'$ is a hydrogen atom, an alkyl radical having from 1 to 4 carbon atoms or the beta-methoxyethyl radical.

At least 60% of the R groups are preferably methyl radicals. The presence of small amounts of units other than $R_2SiO$ along the diorganopolysiloxane chain, for example units of the formulae $RSiO_{1.5}$ and/or $SiO_2$, is not excluded; however, the proportion thereof should, not exceed 2% relative to the number of $R_2SiO$ units.

Particularly exemplary structural units of formulae $R_2SiO$ and $R_3SiO_{0.5}$ and radicals of formula $OR'$ are the following: $(CH_3)_2SiO$, $CH_3(CH_2=CH)SiO$, $CH_3(C_6H_5)SiO$, $(C_6H_5)_2SiO$, $CH_3(C_2H_5)SiO$, $(CH_3CH_2CH_2)CH_3SiO$, $CH_3(n-C_3H_7)SiO$, $(CH_3)_3SiO_{0.5}$, $(CH_3)_2CH_2=CHSiO_{0.5}$, $CH_3(C_6H_5)_2SiO_{0.5}$, $(CH_3)(C_6H_5)(CH_2=CH)SiO_{0.5}$, OH, $-OCH_3$, $-OC_2H_5$, $-O-n-C_3H_7$, $-O-iso-C_3H_7$, $-O-n-C_4H_9$, $-OCH_2CH_2OCH_3$.

These oils and resins are commercially available from the silicone manufacturers and can be prepared by any one of a number of techniques well known to this art.

The reinforcing filler (b) is typically a reinforcing silica filler. Such fillers are characterized by a fine particle size and a high ratio of specific surface area to weight, generally ranging from approximately 50 square meters per gram to more than 300 square meters per gram. Silicas of this type are also commercially available products and are well known to the art of silicone rubbers. These silicas can be prepared via a pyrogenic route (designated the pyrogenic or fumed silicas) or via wet routes (precipitated silicas) and can either be treated or untreated. The chemical nature and the process of preparation thereof are not critical for the purposes of the present invention, provided that the silica is capable of exerting a reinforcing effect in the final product elastomer. The reinforcing filler employed is preferably a pyrogenic silica. The proportion of filler material (b) in the compositions of the present invention is also not strictly critical and advantageously ranges from approximately 5 to approximately 100 parts, preferably 10 to 65 parts, by weight, per 100 parts by weight of the polydiorganosiloxane (a).

The organic peroxide (c) may be any such peroxide which serves as a vulcanizing or curing agent in the subject compositions to form crosslinked silicone elastomers. It may thus be any one of the peroxides or peresters known to this art for producing silicone elastomers, for example di-tert-butyl peroxide, benzoyl peroxide, tert-butyl peracetate, dicumyl peroxide and 2,5-dimethylhexane-2,5-diperbenzoate. The selection of the peroxide, in actual practice, will depend on the process employed to cure the elastomer. For the majority of applications, in particular when the insulating sheathing/coating is applied by extrusion, as is the case in the manufacture of cables or wires, a peroxide will be employed which is active in the absence of applied pressure, for example monochlorobenzoyl peroxide or 2,4-dichlorobenzoyl peroxide. The organic peroxide is employed in proportions which are conventional for the vulcanization of silicone rubbers, advantageously ranging from approximately 0.1 to approximately 7.5 parts by weight per 100 parts by weight of polydiorganosiloxanes.

The size of the mica particles constituting the component (d) of the compositions of the present invention is also not strictly critical, provided that it is sufficiently small to permit a uniform dispersion in the components of the composition. Mica is suitable, for example, in the form of pulverized mica or mica flour. The proportion of mica which is incorporated in the compositions depends on the desired properties of the cured elastomer. Less than 40 parts by weight of mica must be incorporated per 100 parts by weight of polydiorganosiloxane (a).

The compositions according to the present invention preferably comprise 0.5 to 39.8 parts of mica and preferably from 1.5 to 15 parts of mica, per 100 parts by weight of polydiorganosiloxane (a).

The zinc oxide component (e) of the compositions according to the present invention is a white or slightly yellowish powder. The compositions according to the present invention contain, by weight, 0.2 to 10 parts, preferably 0.5 to 5 parts of zinc oxide per 100 parts of the polydiorganosiloxane (a). The sum of the mica and of the zinc oxide per 100 parts of the polydiorganosiloxane polymer does not exceed 40 parts.

In addition to the components specified above, the compositions according to the present invention may contain other additives such as, for example, platinum or platinum compounds or complexes, titanium dioxide, alumina, cerium oxide or hydroxide, iron oxide, CaO or MgO.

The compositions according to the present invention may additionally contain "antistructuring" agents such as, for example, oils having a viscosity of less than 1,000 mPa.s at 25° C. and blocked by hydroxyl groups at each end of the polymer chain. These antistructuring agents are typically employed in a proportion of 0 to 12 parts per 100 parts of polydiorganosiloxane (a).

The compositions according to the present invention may contain polysiloxane resins, designated MQ resins, consisting essentially of $R^2{}_3SiO_{0.5}$ and $SiO_2$ units in which $R^2$ is an optionally halogenated monovalent hydrocarbon radical having less than 7 carbon atoms, the ratio of $R^2{}_3SiO_{0.5}$ to $SiO_2$ ranging from 0.5/1 to 1.2/1.

In addition, the compositions according to the present invention may also contain polysiloxane resins, designated M'Q resins, consisting essentially of $HR^2{}_2SiO_{0.5}$ and $SiO_2$ units in which $R_2$ is as defined above, the ratio of $HR^2{}_2SiO_{0.5}$ to $SiO_2$ ranging from 0.5/1 to 10/1. The preparation of such M'Q resins is described, for example, in U.S. Pat. No. 2,857,356.

In order to further illustrate the present invention and the advantages thereof, the following specific examples are given, it being understood that same are intended only as illustrative and in nowise limitative.

In said examples to follow, it will be seen that the compositions 1 to 3 which did not include the mixture of ZnO+mica, did not permit the production of cured elastomers having the desired properties, whereas the compositions of Examples 4 to 5 (according to the present invention) produced cured elastomers which had good flame resistance and good ash cohesion.

EXAMPLE 1

In this example, neither ZnO nor mica was incorporated in the test composition.

The following constituents were mixed for 2 hours, 45 minutes, at room temperature in a Meili trademark bladed pug mill:

(i) 100 parts by weight of a polydimethylsiloxane resin having a viscosity, at 25° C., of $20 \times 10^6$ mPa.s, containing 720 parts per million of methyl vinylsiloxane recurring structural units in its polymer chain;

(ii) 4 parts by weight of a polydimethylsiloxane oil with hydroxyl end groups, having a viscosity of 50 mPa.s;

(iii) 1 part by weight of pyrogenic TiO2;

(iv) 35 parts by weight of pyrogenic silica having a specific surface area of 300 m$^2$/g (marketed by Degussa under the trademark Aerosil 300), treated with hexamethyldisilazane;

(v) 14 parts by weight of pyrogenic silica having a specific surface area of 150 m$^2$/g (Degussa Aerosil 150);

(vi) 0.3 parts by weight of Fe3O4; and (vii) 0.0008 parts by weight of chloroplatinic acid.

The mixture obtained above was then processed on a two-roll mill and 0.7 part of 2,4-dichlorobenzoyl peroxide was added thereto.

The homogenous mass obtained on the mill was then vulcanized for 8 minutes at 115° C. in a suitable mold to produce tablets having a diameter of 8 mm (namely, having a surface area of 0.5 cm$^2$) and a thickness (height) of 2 mm.

These tablets were then heated in an oven at 850° C. for 1 hour, 30 minutes.

The Table I which follows indicates the appearance of the tablets after cooling, and also the particular pressure that had to be applied to the surface of these tablets to break them. The latter measurements were carried out using a probe that permitted determination of the force applied to the surface of the tablets.

The following Table II indicates the behavior of the ash produced from test specimens vulcanized for 8 minutes at 115° C. which had been subjected to the direct action of a flame for 12 seconds at 843° C. according to the JAR 25853 (b) test, JAR designating Joint Airworthiness Requirements.

EXAMPLE 2

The procedure of Example 1 was repeated, except that the composition contained 5 parts by weight of mica.

The results obtained are also reported in Tables I and II.

EXAMPLE 3

The procedure of Example 1 was repeated, except that the composition contained 5 parts of ZnO. The results obtained are also reported in Tables I and II.

EXAMPLE 4

The procedure of Example 1 was repeated, except that the composition contained 2.5 parts of mica +2.5 parts of ZnO.

The results obtained are also reported in Tables I and II.

EXAMPLE 5

The procedure of Example 1 was repeated, except that the composition contained 5 parts of mica +2.5 parts of ZnO.

The results obtained are also reported in Tables I and II.

TABLE I

Compressive strength of the tablets after treatment for 1 h, 30 min, in an oven at 850° C.:

| Example | | |
|---|---|---|
| Example 1 | Specimens cracked after cooling | Tablets burst when a pressure of 2 Ncm$^{-2}$ was applied |
| Example 2 | Specimens cracked after cooling | Tablets burst when a pressure of 3 Ncm$^{-2}$ was applied |
| Example 3 | Coherent tablets | Burst at pressures greater than 5 N cm$^{-2}$ |
| Example 4 | Coherent tablets | Burst at pressures greater than 5 N cm$^{-2}$ |
| Example 5 | Coherent tablets | Burst at pressures greater than 5 N cm$^{-2}$ |

TABLE II

Specimens subjected to the direct action of a flame for 12 seconds at 843° C., JAR standard 25 853 (b):

| | |
|---|---|
| Example 1 | Non-cohesive ash |
| Example 2 | Brittle ash |
| Example 3 | Hard and brittle ash with formation of large and deep cracks on cooling |
| Example 4 | Coherent cracks withstanding a pressure of 5 N cm$^{-2}$ |
| Example 5 | Coherent cracks withstanding a pressure of 5 N cm$^{-2}$ |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A heat-vulcanizable silicone elastomer composition of matter comprising (a) at least one polydiorganosiloxane polymer, (b) a reinforcing filler material, (c) a vulcanizing agent therefor, and including a fireproofing and mechanical strength-enhancing amount of (d) mica and (e) zinc oxide.

2. The silicone composition as defined by claim 1, comprising from 0.5 to 39.8 parts by weight of said mica (d) and from 0.2 to 10 parts by weight of said zinc oxide (e), per 100 parts by weight of said polydiorganosiloxane polymer (a).

3. The silicone composition as defined by claim 2, comprising not more than 40 parts by weight of the total amount of mica (d)+zinc oxide (e).

4. The silicone composition as defined by claim 2, comprising from 1.5 to 15 parts by weight of mica (d) and from 0.5 to 5 parts by weight of zinc oxide (e).

5. The silicone composition as defined by claim 1, said filler material (b) comprising a pyrogenic silica.

6. The silicone composition as defined by claim 1, said polydiorganosiloxane polymer (a) having a viscosity greater than 1,000,000 mPa.s at 25° C.

7. The silicone composition as defined by claim 1, said polydiorganosiloxane polymer (a) having a viscosity ranging from 50,000 to 1,000,000 mPa.s at 25° C.

8. The silicone composition as defined by claim 2, wherein said vulcanizing agent (c) is an organic peroxide in an amount of from 0.1 to 7.5 parts by weight, per 100 parts by weight of said polydiorganosiloxane polymer (a).

9. The silicone composition as defined by claim 1, comprising particulate mica (d) and zinc oxide (e) homogeneously dispersed therein.

10. The silicone composition as defined by claim 1, further comprising an MQ resin or a resin consisting essentially of HR$^2$$_2$SiO$_{0.5}$ and SiO$_2$ units in which R$^2$ is an optionally halogenated monovalent hydrocarbon radical having less than 7 carbon atoms, the ratio of HR$^2$$_2$SiO$_{0.5}$ to SiO$_2$ ranging from 0.5/1 to 10/1.

11. The silicone composition as defined by claim 1, in cured elastomeric state.

12. A solid substrate protectively coated with the silicone composition as defined by claim 1.

13. A solid substrate protectively coated with the silicone composition as defined by claim 11.

* * * * *